United States Patent
Watanabe et al.

(10) Patent No.: US 6,917,685 B1
(45) Date of Patent: Jul. 12, 2005

(54) IP KEY MANAGEMENT MECHANISM WITH DIVERGENCE BARRIER INCREASING ENTROPY AGAINST COMPUTATIONAL CRYPTO-ANALYSES

(75) Inventors: Eiji Watanabe, Kanagawa (JP); Hiroshi Take, Kanagawa (JP); Yoshihiro Sekiguchi, Tokyo (JP); Tomo Yamada, Tokyo (JP); Yasuo Tojima, Chiba (JP)

(73) Assignee: Meteora System Co., Ltd. (JP)

( * ) Notice: Subject to any disclaimer, the term of this patent is extended or adjusted under 35 U.S.C. 154(b) by 0 days.

(21) Appl. No.: 09/647,676
(22) PCT Filed: Feb. 4, 1999
(86) PCT No.: PCT/JP99/00476
§ 371 (c)(1), (2), (4) Date: Oct. 3, 2000
(87) PCT Pub. No.: WO00/46967
PCT Pub. Date: Aug. 10, 2000

(51) Int. Cl.[7] ................................................ H04L 9/22
(52) U.S. Cl. .................... 380/262; 380/46; 380/268; 380/277; 713/171
(58) Field of Search .................... 380/46, 262, 268, 380/277; 705/71; 713/171; 259/277

(56) References Cited

U.S. PATENT DOCUMENTS

| | | | | |
|---|---|---|---|---|
| 5,196,840 A | * | 3/1993 | Leith et al. | 340/5.26 |
| 5,491,750 A | * | 2/1996 | Bellare et al. | 713/155 |
| 5,668,877 A | * | 9/1997 | Aziz | 380/30 |
| 6,628,786 B1 | * | 9/2003 | Dole | 380/44 |
| 6,707,914 B1 | * | 3/2004 | Bell | 380/46 |
| 6,708,273 B1 | * | 3/2004 | Ober et al. | 713/189 |

FOREIGN PATENT DOCUMENTS

| | | |
|---|---|---|
| JP | 10-020783 | 1/1998 |
| JP | 10-285154 | 10/1998 |

OTHER PUBLICATIONS

Japanese Official Action and English Translation Thereof, dated Feb. 17, 2004.

Stallings, William, Cryptography and Network Security, 1998, Prentice Hall, NJ, XP002117580, 1998, p. 421, Line 24—p. 431, line 10.

Rodney Thayer, Bulletproof IP With authentication and encryption, IP Sec adds a layer of armor to IP, Data Communications, vol. 26, No. 16, Nov. 21, 1997, pp. 55–58, 60.

Interntional Search Report dated Oct. 18, 1999.

* cited by examiner

Primary Examiner—Andrew Caldwell
Assistant Examiner—Minh Dieu Nguyen
(74) Attorney, Agent, or Firm—Blank Rome LLP (57) ABSTRACT

A key generator (51, 61) generates, from an IP-key (11) for entering a closed IP network (1), a set (52, 62) of session keys (53, 63) indexed for identification, an index pointer (71, 72) points an index (i, j) to identify a session key (53, 63), the set (52, 62) of session keys has a divergence barrier incorporated therein for barring a computational approach to any session key (53, 63), and an unbar data set (i, j, 62) unbars the divergence barrier.

8 Claims, 7 Drawing Sheets

IP KEY MANAGEMENT MECHANISM WITH DIVERGENCE BARRIER INCREASING ENTROPY AGAINST COMPUTATIONAL CRYPTO-ANALYSES

TECHNICAL FIELD

The present invention relates to an IP (internet protocol) key management mechanism for an internet security architecture.

More specifically, the invention relates to a key management mechanism for an IP-layer security, as a component mechanism of a security architecture for internets, in which a crypt-system employs an algorithm for automatic generation of session keys to support the Perfect Secrecy[*1], i.e. a perfect forward secrecy[*2] against break-backward analyses and/or a perfect backward secrecy against known-key attacks, by information-theoretically isolating the session keys from each other, without relying on computational difficulties.

BACKGROUND ART

For the IP-layer security of router networks, proposed protocols[*3] each require a pair of unique encryption and decryption keys for a respective IP datagram.

A solution for the requirement may be such an automatic key generation system that derives a series of pairs of session keys from an original keying material. A respective derived pair is employable to generate a sequence of pairs of encryption and decryption keys for an extensive use of the original keying material, with a problem that a compromised secrecy of a session key permits an access to past, used keys and future, yet unused keys.

An IPSEC (Internet Protocol Security) Working Group of the IETF (International Engineering Task Force) has drafted an ISAKMP (Internet Security Association and Key Management Protocol)[*4] as a framework for key management to support a current IPSEC protocol and a subsequent IPv6 (Internet Protocol version 6), and an Oakley[*5] as a set of key determination protocols for current use, with a postponed solution to the problem.

The ISAKMP and Oakley support the perfect forward secrecy to a practical extent.

However, in the IP-layer with a mechanism to a standard default algorithm DES(Data Encryption Standard)-CBC (Cipher Block Chaining), a conforming session key has a reduced security due to cookies transmitted on a net, and a resultant short-term security service calls for a frequent Diffie-Hellman key exchange to an extent that causes a fairly high traffic overhead via out-of-band mechanisms. The performance subjected to high overhead and the security of session keys have a trade-off relationship to each other.

DISCLOSURE OF INVENTION

The present invention has been achieved with such points in view.

It therefore is an object of the invention to provide an IP key management mechanism, in which the conventional trade-off relationship is eliminated, permitting a long-term security service of an original keying material, supporting the Perfect Secrecy of session keys, providing an IP-Inline security service free from frequent interruptions via out-of-band mechanisms.

To achieve the object, according to an aspect of the invention, there is provided a key management mechanism comprising an IP-key for entering a closed IP network, a key generator for generating from the IP-key a set of session keys indexed for identification, the set of session keys having a "divergence" barrier incorporated therein for barring a computational approach to an arbitrary session key, an index pointer for pointing an index to identify a session key, and an unbar data set for unbarring the divergence barrier.

According to the aspect of the invention, a key management mechanism includes an IP key, a key generator, and an index pointer. The IP key is for entering a closed IP network. The key generator is responsive to the IP key, to generate a set of session keys employable in the network. Session keys in the generated key set are each indexed for identification, and the index pointer points an index to identify a session key used or to be used in the network, permitting a voluntary key selection to be independent of an order of key generation.

One may fetch a used session key, and try a computational approach therefrom in either or both of forward and backward senses of a temporal direction of the key selection, i.e., toward any session key that may be a past, used key or a future, yet unused key.

However, the key set has an always effective "divergence" barrier, i.e. a "bi-directional or universal divergent nature" as a barrier, incorporated therein for barring the computational approach, whether the approach is forward and/or backward with respect to the temporal direction of the key selection which may be wholly or partially identical to or different from the order of key generation.

Any such approach should have a practical limit, so along as it is computational. On the contrary, the barring divergence can be a voluntary setting in a mathematical field, which can by far over-range the computational limit with ease, with a sufficient allowance to absorb or eliminate the conventional trade-off relationship, permitting a long-term security service of the keying material, supporting the Perfect Secrecy of session keys, providing an IP-inline security service free from frequent interruptions via out-of-band mechanisms.

In this respect, the key management mechanism further comprises an unbar data set as a set of data for unbarring the divergence barrier, unveiling the set of session keys to associated peers, allowing the IP-inline security service for the peers.

Preferably, an arbitrary pair of session keys in the key set may be information-theoretically isolated from each other by a drop of information therebetween having a corresponding entropy difference, and the divergence barrier may develop as an integrated entropy difference along a way of the computational approach. The key generator can have a huge key space for generation of session key sets, and each key set generated can have a sufficient size for the entropy integration to diverge beyond a computationally secure entropy difference. The drop of information makes even a theoretical approach for unique solution unsuccessful in any way. The unbar data set may preferably define the drop of information between the arbitrary pair of session keys. The drop of information may preferably comprise a lost data on either or both of a sign data and a numeral data of a respective session key.

Moreover, the divergence barrier may comprise a tree of candidate keys for the arbitrary session key, the tree of candidate keys may diverge with an increasing number of candidate keys beyond a computationally secure number, as the computational approach makes a way in the key set, and the unbar data set may define a unique candidate key to be the arbitrary session key.

Further, the index pointer may preferably point the index of any session key no more than one time. It is ideal for security to use a current key simply one time. Any session key in the generated key set can be a current key, as it's index always permits a current choice by the index pointer.

Further, part of the unbar data set may preferably be built in an outer IP header as a cleartext and transmitted on networks to a communication peer for a connection-less mission of a key agreement in the IP-layer.

BRIEF DESCRIPTION OF DRAWINGS

The above and further objects and novel features of the present invention will more fully appear from the following detailed description when the same is read in conjunction with the accompanying drawings, in which.

BEST MODE FOR CARRYING OUT THE INVENTION

There will be described an IP key management mechanism according to an embodiment of the invention, with reference to the accompanying drawings. Like components are designated by like reference characters.

Figure 1:
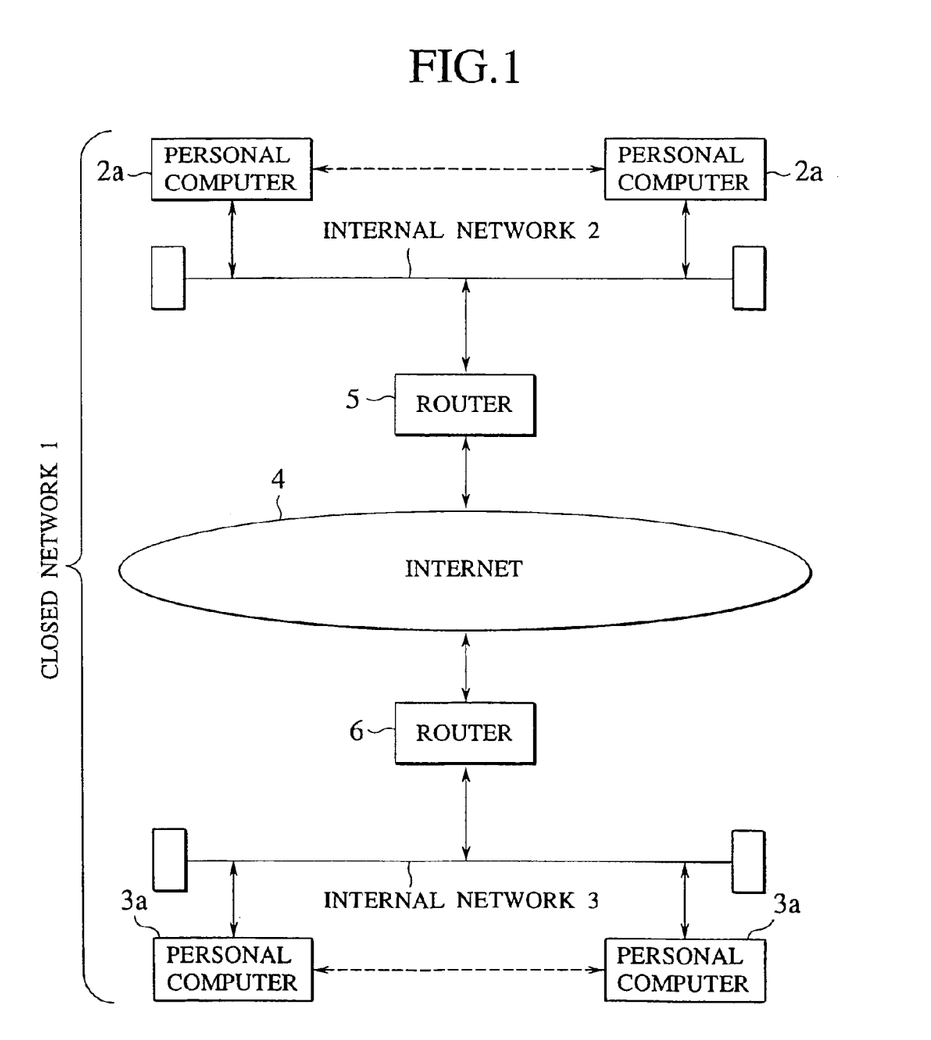
FIG. 1 is block diagram of a closed IP network.
Figure 2:
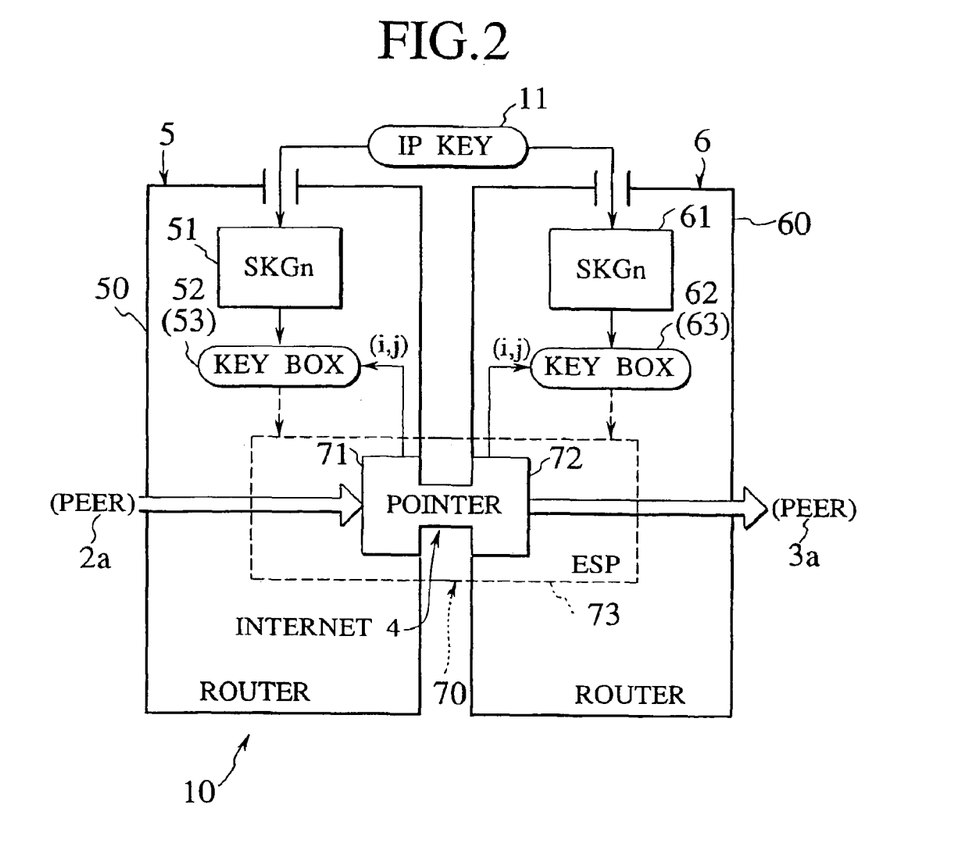
FIG. 2 is a block diagram of an IP key management mechanism according to an embodiment of the invention.

FIGS. 1 and 2 show a closed IP network 1 and an IP-inline key management mechanism 10 according to an embodiment of the invention, respectively.

The closed IP network 1 includes: a first internal network 2 having a first group of personal computers as communication peers 2a; a second internal network 3 having a second group of personal computers as communication peers 3a; and an internet 4 communicating via a first router 5 with the first network 2 and via a second router 6 with the second network 3.

The IP-inline key management mechanism 10 has:

an IP key 11 as a data to be manually keyed for peers 2a and 3a to enter the closed IP network 1;

first equipment 50 furnished to the first router 5, including a first "session key automatic generator" (hereafter called "SKGn") 51 responsive to the IP key 11 to generate a first sequence of I key boxes 52 each indexed for identification by a corresponding index i, each key box 52 containing a first sequence of J session keys 53 each indexed for identification by a corresponding index j, and control programs therefor;

second equipment 60 furnished to the second router 6, including a second SKGn 61 identical to the first SKGn 51 and responsive to the IP key 11 to generate a second sequence of I key boxes 62 each indexed for identification by a corresponding index i, each key box 62 containing a second sequence of J session keys 63 each indexed for identification by a corresponding index j, and control programs therefor; and a communication system 70 including a first index pointer 71 for controlling a first combination (i,j) of the indices i and j at the first router end, a second index pointer 72 for controlling a second combination (i,j) of the indices i and j at the second router end, and a set of programmed implements 73 for connection-less communications for IP security ESP (encapsulating security payload) and AH (authentication), from a source peer 2a via the internet 4 to a destination peer 3a (or vice versa), ensuring that the first and second index combinations (i,j) are identical to each other. The first and second index pointers 71, 72 each comprise a combination of a first or second i-pointer and a first or second j-pointer for independently pointing the indices i and j, respectively.

Figure 3A:
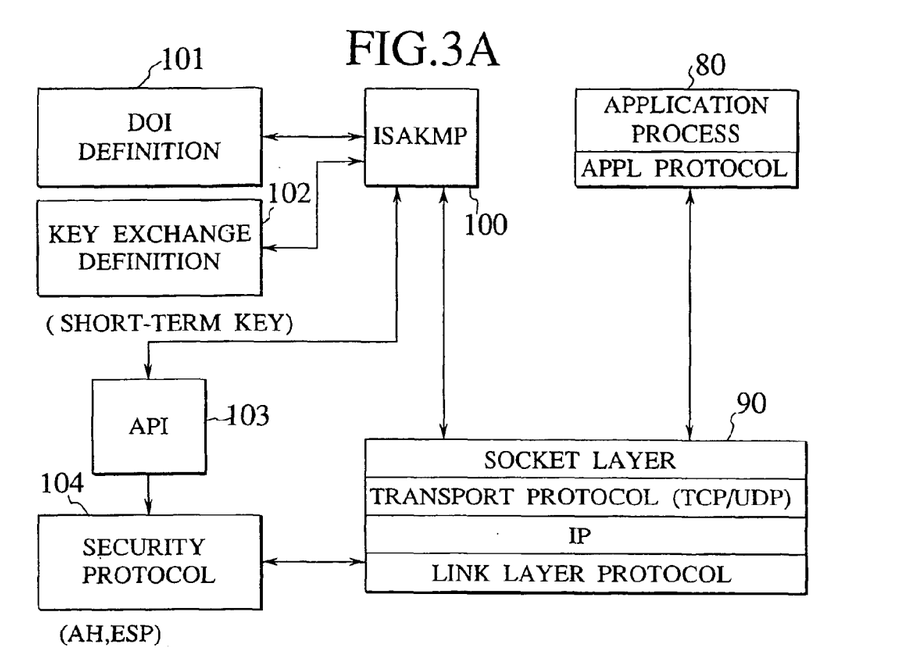
FIG. 3A is a block diagram describing ISAKMP relationships conforming to an internet draft[*6]

FIG. 3A shows a crypt-algorithm in conformity with an internet draft[*6], in which:

an application layer 80 having an application process based on an application protocol is linked with a socket layer of a communication hierarchy 90 including the socket layer, a transport layer (TCP [transmission control protocol], UDP [user datagram protocol]), an IP layer and a link layer; and an ISAKMP 100 linked with the socket layer cooperates with a DOI definition 101 and a key exchange definition 102 to provide a short-term key via an API (application programming interface) 103 for a security protocol 104 covering AH and ESP and linked with the link layer. The ISAKMP 100 and associated elements are responsible for key establishment, i.e. key generation and transport, and constitute an out-of-band mechanism relative to session keys.

This algorithm supports a perfect forward secrecy at the sacrifice of performance causing a fairly high overhead.

Figure 3B:
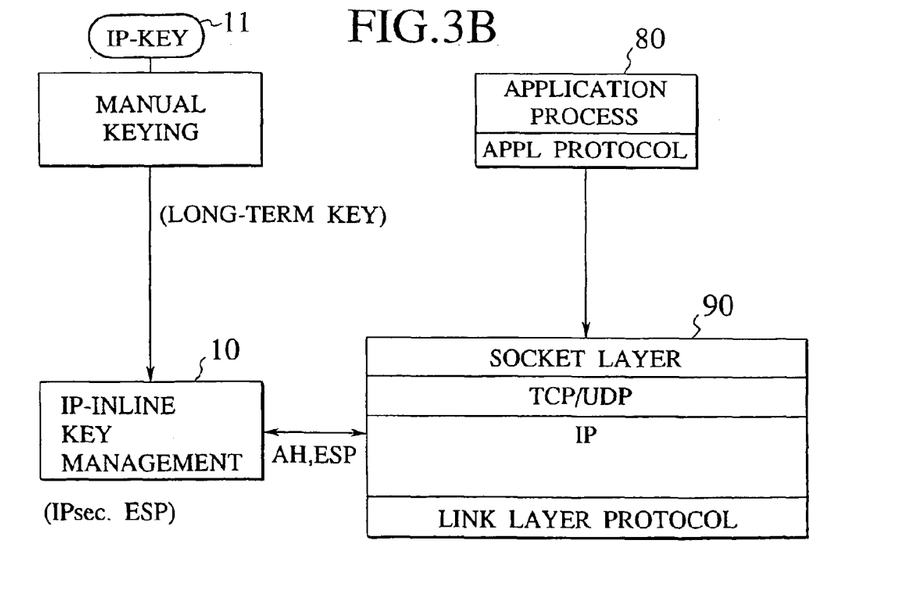
FIG. 3B is a block diagram describing a crypt-algorithm of the IP key management mechanism according to the invention.

FIG. 3B shows, in comparison with FIG. 3A, a crypt-algorithm for the IP-inline key management mechanism 10 of FIG. 2, in which the mechanism 10 linked with an IP layer has a long-term key based on a manual keying of the IP key 11, and supports an overhead-free Perfect Secrecy as will be seen from the following description. Manual keying is supported, as required[*3].

Each session key generator SKGn 51, 61 of FIG. 2 generates the I key boxes 52, 62 of J session keys 53, 63 by partially overlapped or separated three portions, sections or steps (hereafter collectively called "step"), as follows.

Figure 4:
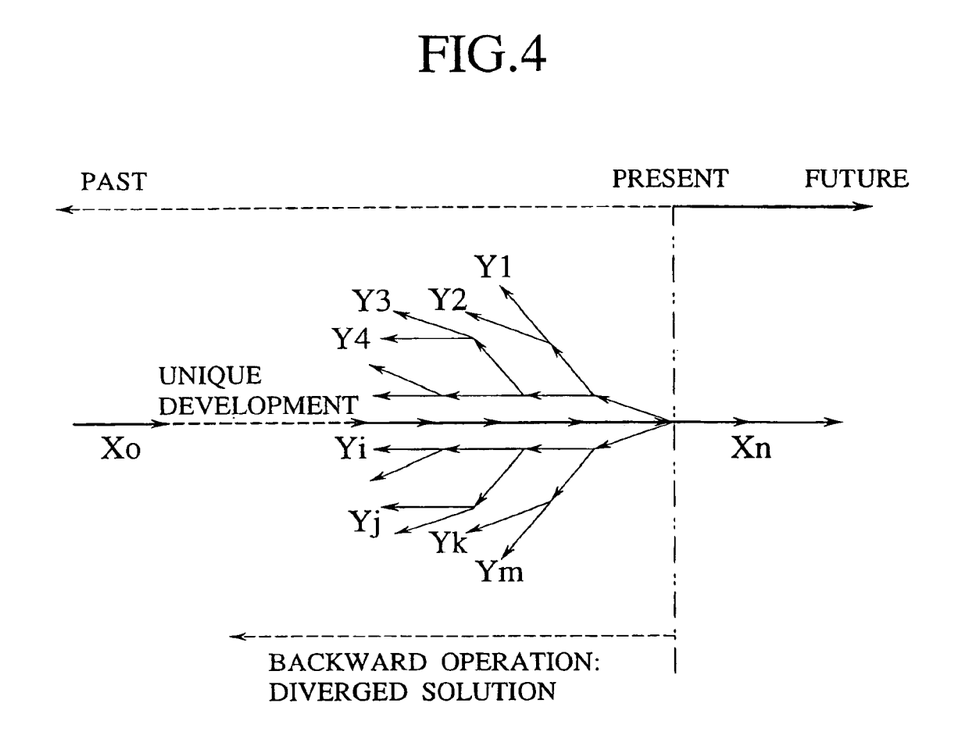
FIG. 4 is a diagram illustrating a backward divergent nature of intermediate keys generated by a logistic mapping[*7] in a session key generator of the IP key management mechanism of FIG. 2.
Figure 5A:
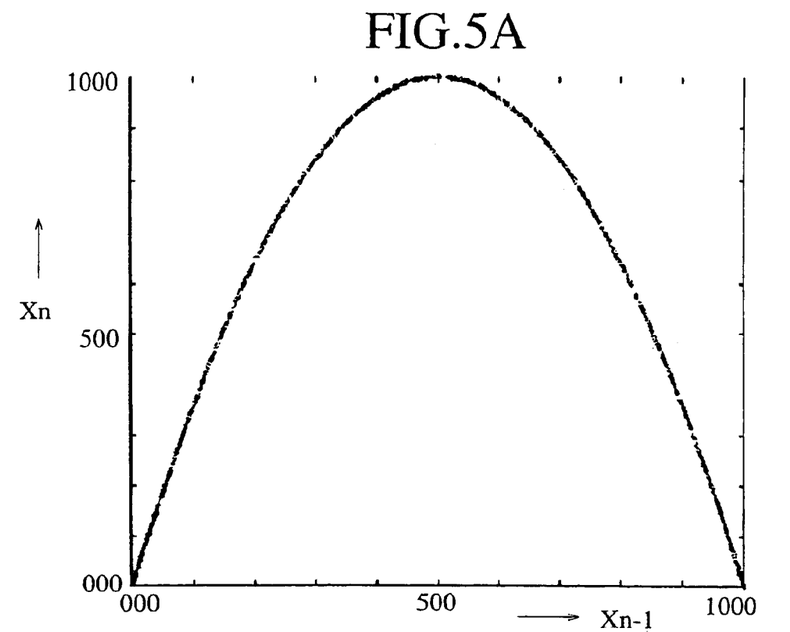
FIG. 5A is a graph of the logistic mapping.

At a first step, the SKGn responds to an input data [$X_0$ of FIG. 4] of the IP key 11 to temporally sequentially generate a set of "intermediate keys having a backward divergent nature as a barrier incorporated therein for supporting a perfect forward secrecy" (hereafter called "forward-barrier keys [$X_n$ of FIGS. 4 and 5A]").

Figure 5B:
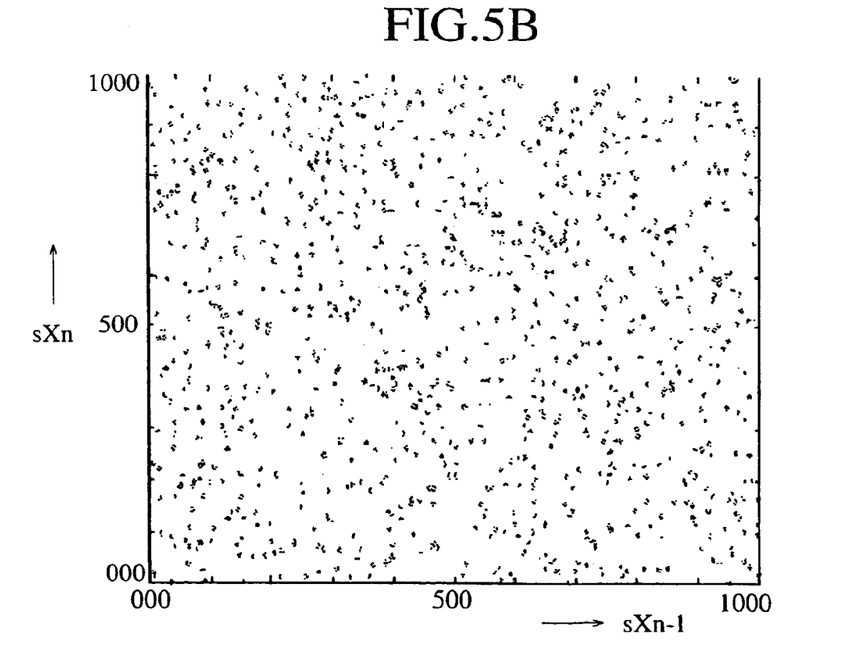
FIG. 5B is a Lorentz plot illustrating keys supporting the Perfect Secrecy.

At a second step, the SKGn responds to the forward-barrier keys to generate a set of temporally sequential "intermediate keys having a forward divergent nature as a barrier incorporated therein for supporting a perfect backward secrecy, in addition to the backward divergent nature for the perfect forward secrecy" (hereafter called "perfect-barrier keys [$sX_n$ of FIG. 5B]").

At a third step, the SKGn have index combinations (i,j) sequentially allotted to the perfect-barrier keys and recognizes I subsequences of thus indexed perfect-barrier keys to be the key boxes 52, 62 and J indexed perfect-barrier keys therein to be the session keys 53, 63.

More specifically, as illustrated by FIG. 4, the session key generator SKGn is adapted at the first step to generate from the IP-key $X_0$ a set $\{X_n\}$ of unique forward-barrier keys $X_n$, by way of a logistic mapping (see FIG. 5A) such that: $X_n = 4X_{n-1}(1-X_{n-1})$, where $0 < X_n < 1$, and n is an arbitrary integer.

The logistic mapping allows a trace-back operation from an arbitrary forward-barrier key $X_n$ to an antecedent forward-barrier key $X_{n-1}$, such that $X_{n-1} = \{1 \pm \sqrt{(1-X_n)}\}$, which gives a pair of equally suspicious candidate keys: Y1 $(=1+\sqrt{(1-X_n)})$ and Y2 $(=1-\sqrt{(1-X_n)})$ for the antecedent key $X_{n-1}$, with an uncertainty of 1 bit to be (+) or (−). Therefore, the trace-back operation between the forward-barrier keys $X_{n-1}$ and $X_n$ is barred with the uncertainty, which constitutes an entropy difference of 1 bit that corresponds to a drop of information on whether (+) or (−).

In other words, a respective pair of neighboring forward-barrier keys $X_{n-1}$ and $X_n$ are information-theoretically isolated in a backward direction by an entropy difference of 1 bit, which gives a backward divergent nature to the key pair $X_{n-1}$ and $X_n$, which nature appears in the form of a backward divergent tree of candidate keys, constituting a forward-barrier for barring a trace-back operation in the key pair $X_{n-1}$ and $X_n$.

Therefore, an arbitrary pair of forward-barrier keys $X_{n-p}$ and $X_n$ ($0 < p \leq n$) are isolated in the backward direction by an entropy difference of p bits equivalent to an integration or sum of intervening p entropy differences, which gives a backward divergent nature to the key pair $X_{n-p}$ and $X_n$, which nature appears as a p-times diverged backward divergent tree of $2^p$ candidate keys (like Y1, Y2, Y3, Y4, ..., Yi, Yj, Yk, Ym, ... in FIG. 4), and constitutes a forward-barrier for barring a trace-back approach between $X_{n-p}$ and $X_n$. The forward-barrier supports a perfect forward secrecy, as p is increased.

At the second step, the session key generator SKGn is adapted for a shift operation on a respective forward-barrier key $X_n$, to drop a total of s (s>0) leading digits of the forward-barrier key $X_n$, to provide a shifted barrier key $sX_n$ as a corresponding perfect-barrier key.

For example, letting s=4, and a concerned forward-barrier key $X_n$ be such that:

$X_n$=85763521018383873495632l . . . in decimal notation, its leading 4 digits '8567' are dropped to provide a corresponding perfect-barrier key $sX_n$, such that:

$sX_n$=35210183838734956321 . . . in decimal notation.

Therefore, any reverse-shift operation from the perfect-barrier key $sX_n$ to the forward-barrier key $X_n$ is subjected to a total of $10^s$ ($10^4$ in this case) equally suspicious solutions. This uncertainty constitutes an entropy difference of q bits (12<q<13 for s=4), which directionally acts as a backward barrier for barring the reverse-shift operation between the barrier keys $X_n$ and $sX_n$.

An antecedent forward-barrier key $X_{n-1}$ is likewise shifted to an antecedent perfect-barrier key $sX_{n-1}$. Between these barrier keys $X_{n-1}$ and $sX_{n-1}$ also, there is an entropy difference of q bits acting as a directional backward barrier for barring a reverse-shift operation therebetween.

Like this, there is generated a set of perfect-barrier keys $\{sX_n\}$, such that:

As each effective q-bit backward barrier is additive to any effective 1-bit forward barrier, an arbitrary perfect-barrier key $sX_n$ is information-theoretically isolated (as in FIG. 5B) by an entropy difference of q bits along a route ($sX_{n-1} \rightarrow X_{n-1} \rightarrow X_n \rightarrow sX_n$) from an antecedent perfect-barrier key $sX_{n-1}$, and by an entropy difference of q+1 bits along a route ($sX_n \leftarrow X_n \leftarrow X_{n+1} \leftarrow sX_{n+1}$) from a subsequent perfect-barrier key $sX_{n+1}$. With respect to an r-th (r>0) subsequent perfect-barrier key $sX_{n+r}$, the isolation enlarges as r increments. Along a direct route ($sX_n \leftarrow sX_{n+1} \leftarrow \ldots \leftarrow sX_{n+r-1} \leftarrow sX_{n+r}$), the isolation appears as an entropy difference of (q+1)*r bits, exceeding (12*r+r) bits for s=4.

Like this, an arbitrary pair of perfect-barrier keys $sX_n$ and $sX_{n+r}$ are bi-directionally isolated from each other by entropy differences to be integrated along associated routes therebetween. The bi-directional isolation gives a bi-directional or universal divergent nature to the key pair $sX_n$ and $sX_{n+r}$, which nature appears as a bi-directionally divergent tree of candidate keys, constituting a bi-directional barrier for barring any computational approach, to support the Perfect Secrecy.

At the third step, all perfect-barrier keys $\{sX_n\}$ are arrayed to be sequentially identified in a forward or reverse direction by combinations (i,j) of discrete or apparently sequential indices i and j, and recognized as a set of I*J session keys 53 or 63 contained in I key boxes 52, 62. Then, simply an arbitrary i-th key box 52, 62 is pointed by the index pointer 71, 72, to be registered for use.

Figure 6:
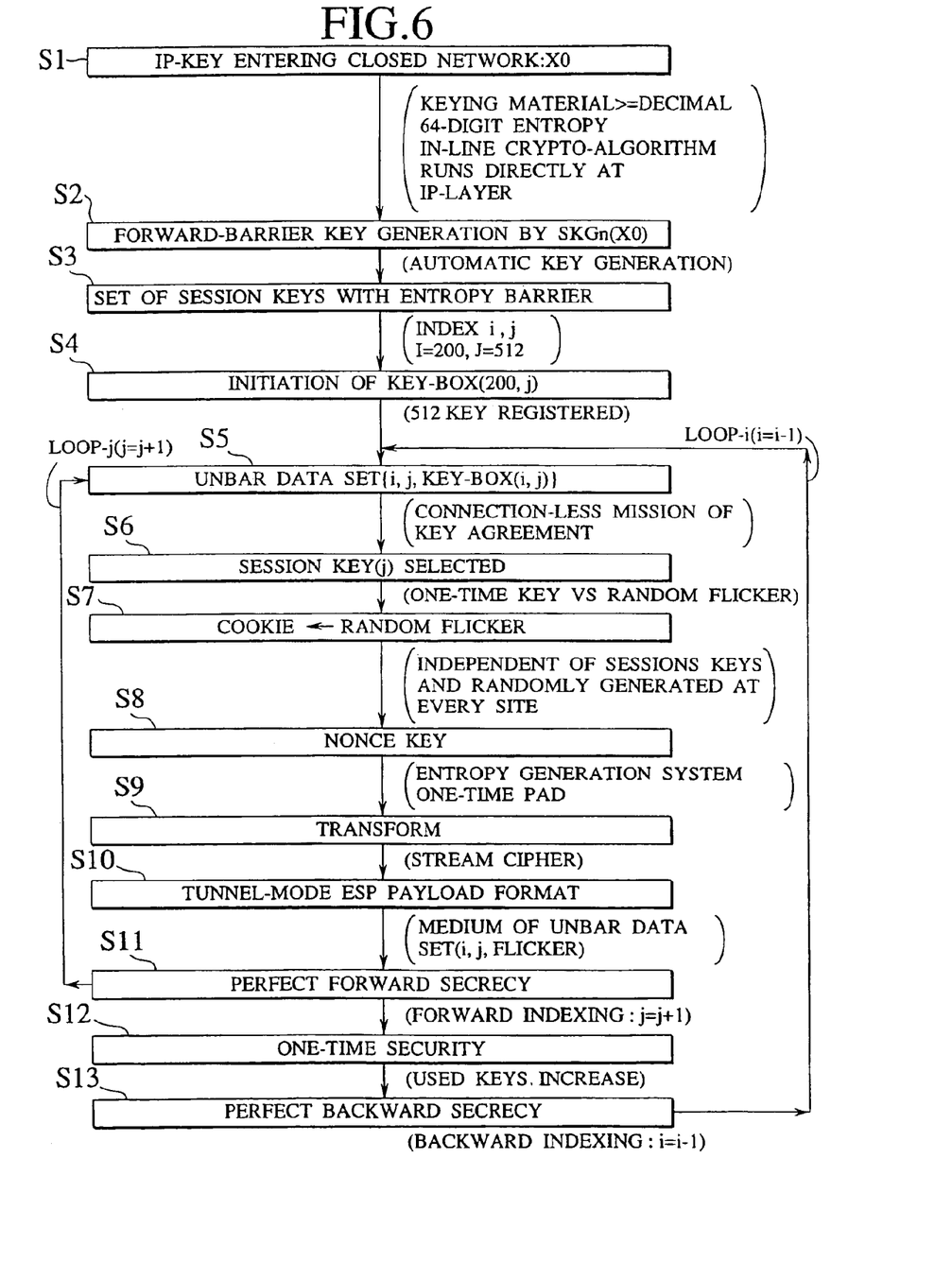
FIG. 6 is a flow chart of actions of the IP key management mechanism of FIG. 2.
Figures 7, 8:
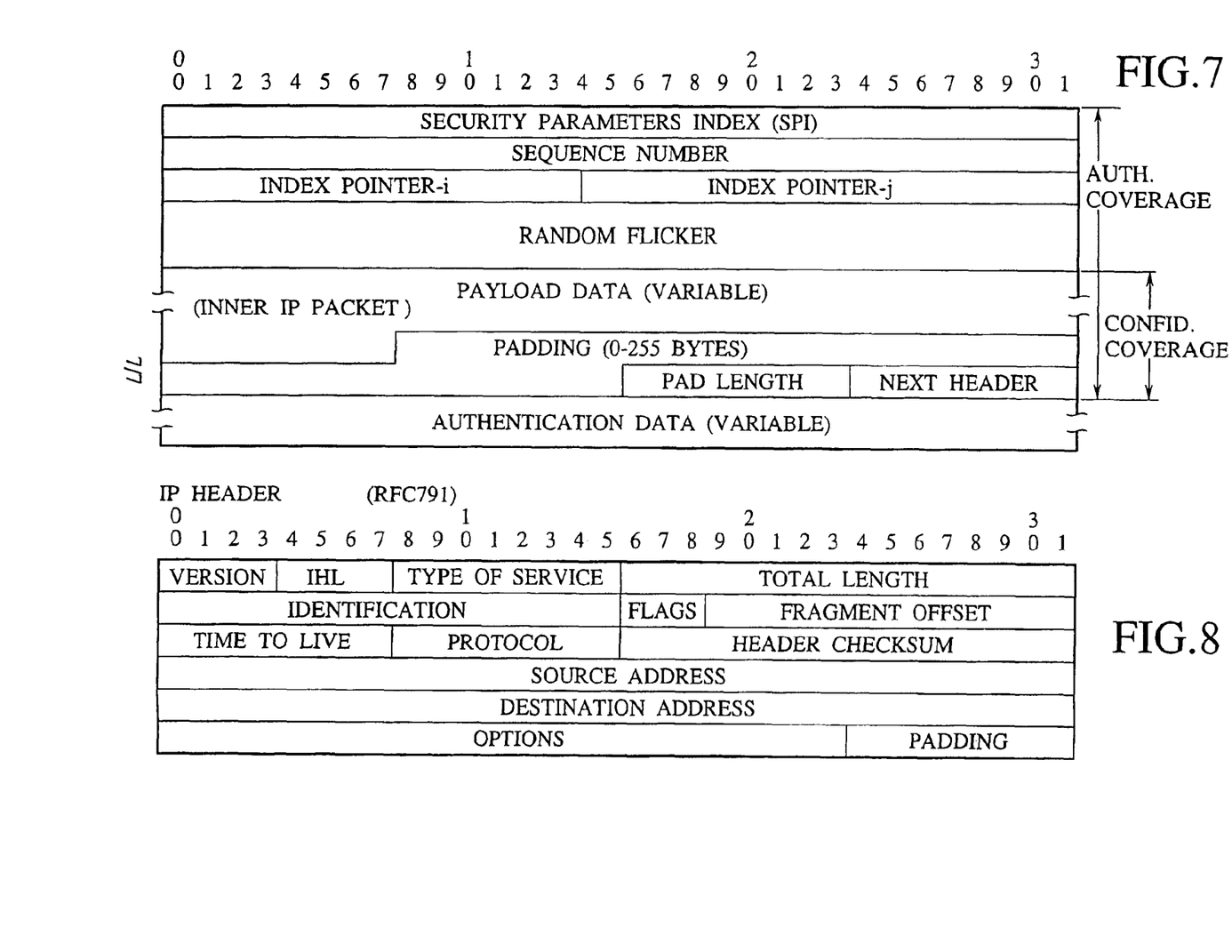
FIG. 7 is a data format for a tunnel-mode encapsulating security payload implementing the IP key management mechanism of FIG. 2 to make actions of FIG. 6.
FIG. 8 is a data format for an outer IP header.

FIG. 6 describes a flow of actions of the IP-inline key management mechanism 10, in which I=200, J=512, s=4, and $X_0$=an integer from a field of random numbers having an entropy of 64 digits in decimal notation. FIGS. 7 and 8 show formats for a tunnel-mode ESP and an outer IP header.

At a step S1, a data $X_0$ of the IP key 11 is manually entered, and input to each SKGn 51, 61.

At a step S2, each SKGn generates a set of forward-barrier keys $\{X_n\}$.

At a step S3, each SKGn generates a set of perfect-barrier keys $\{sX_n\}$, identifies I*J perfect-barrier keys by labeling with indices i and j, and recognizes them as a set of I*J sequential session keys 53, 63 divided in subsets and placed in I key boxes 52, 62 in memories.

At a step S4, with the first i-pointer=B (default=200 in this case), a pointed key box (hereafter referred as "key box (B)") 52 is left in a memory region, while the remaining key boxes 52 are abandoned. The key box (B) has J session keys 53 for selection by the first j-pointer under control of programs.

At a step S5, as the j-pointer is operated at the first router end, there is provided a defined unbar data (B,j [=K in Step S6]), which will be informed in a later-described manner to the second router end, where it will be processed for the second pointer 72 to identify a corresponding session key (B, j) in the sequence of I*J session keys 63. The unbar data (B, j) is thus cooperative with the session keys (i, j) 63 to constitute an unbar data set for unbarring the divergence barrier.

At a step S6, the operated j-pointer designates j=K (to be 1 at first), and a pointed session key (B, K) is selected for encryption.

At a step S7, a random flicker is read, which is a random number of 8 digits in decimal notation. As the session key (B, K) has 64 digits in decimal notation, the random flicker is small enough, in information quantity, to provide a relatively secure cookie.

At a step S8, the selected session key (B, K) is modified with the random flicker, to provide a nonce key for one-time use. The random flicker thus constitutes part of the unbar data set.

At a step S9, a transform is performed by using a stream cipher. The transform is what is used to secure the communication channel. For the stream cipher, an engine produces a sequence of binary bits having as high entropy as the nonce key.

At a step S10, an inner IP packet encrypted at the step S9 is carried in accordance with a tunnel-mode ESP payload format of FIG. 7 A combination of the steps S5 to S10 is responsible for one ESP to be processed in milliseconds.

At a step S11, the first j-pointer increments in a forward indexing manner, such that j=j+1 (i.e. K=K+1), to support a perfect forward secrecy. The flow again goes to step S5 along Loop-j.

At a step S12, after j=J, the first j-pointer again goes to j=1, so long as one-time security is effectively held.

At a step S13, as the key box (B) is fully used, the i-pointer decrements in a backward indexing manner, such that i=i−1 (i.e. B=B−1), to support the perfect backward secrecy against known-key attacks. The flow again goes to step S5 along Loop-i.

After i=1 or while B>0, the flow again goes to step S1.

Incidentally, as to Step S1, the integer $X_0$ (IP key 11) may be stored as a data in a 3.5-inch disk or IC (integrated circuit) card, to be read therefrom.

In connection with Step S5, the key box (B) has a divergence barrier incorporated therein as an entropy barrier, which is intrinsic in barrier key generation by SKGn itself, and needs an unbar data set as vital crypt-information for unbarring the divergence barrier. In a sense, the unbar data set comprises a sequence of key boxes, and a sequence of index combinations (i, j) for identifying a sequence of unique session keys in the sequence of key-boxes, and a combination of i-pointer and j-pointer constitutes a deterministic crypt-data for opening a key box (B), which data however is stored as a cleartext in a memory. Communication peers 2a, 3a must share the unbar data set for a key agreement, for which a communication medium is necessary and provided in the form a tunnel-mode ESP payload format as in FIG. 7. This shows that the index pointers are unencrypted, and never occupy part of an inner IP header, but parts of an outer IP header (FIG. 8) as a cleartext, which allows for communication peers 2a, 3a to successfully commit a key agreement in connection-less communication. A third party may access to the crypt-data with ease, and may try crypt-analyses thereon, but will only be left trying for an exhaustive search in the filed of $10^{64}$ keys. The current proposal[*6] requires an originator to control SA's (security associations) of recipients. The present embodiment is different, in which a source peer simply controls an unbar data set of its own site, without having unbar data sets of other sites. Such a simplicity is an epoch-making for router networks as VPN's (virtual private networks), as the IP traffic is a mere connection-less flow from an originator to recipients.

As to Step S7, the random flicker may be designed as a random number carrying event data in its initial value, such as setup date and time at a respective site, and programmed to appear with an even probability in respect of the initial value. Note that random flickers are so randomly initialized at every site as to be independent of the randomness of session keys.

The Step S8 corresponds to an entropy generation system in which a small entropy of a flicker is converted into a large entropy of a nonce key. As the flicker is selected from a group of integers having decimal 8 digits appearing with an even probability to an initial value, the entropy generation system can prepare $10^8$ different nonce keys from a session key. Such a nonce key is different by site. The nonce key aims at one-time pad to be shared by communication peers.

At the step S10, the unbar data set (i=B, j=K, flicker) is unencrypted but covered with authentication and integrity.

At the step S11, for a respective IP-security ESP, one session key is employed. After encryption of a single datagram, the j-pointer increments by unity. In IP-inline key management mechanism 10, the perfect forward secrecy is supported by virtue of an information-theoretical independency or isolation established between a respective current key and any past, used key. In this connection, each session key has an effective forward barrier and an effective backward barrier, as it is identified in a given set of perfect-barrier keys $\{sX_n\}$ in a thinning manner. Letting t be a thinning interval, a respective pair of neighboring session keys comprise a perfect-barrier key $sX_n$ and another perfect-barrier key $sX_{n+t+1}$, from which the former $sX_n$ is isolated by an apparent entropy difference of $(q+1)*(t+1)$ bits, exceeding $13*(t+1)$ bits for s=4.

At the step S12, the effect of one-time security depends on a size of the field of nonce keys that is $J(=512)*10^8$. As respective sites have their random timings for flicker initialization, an arbitrary site may execute a manual and/or programmed control for limiting the reuse of key box (B) to avoid uneven or inclined probability in flicker selection that may develop with an increased number of times of reuse of session keys.

At the step S13, as the key box (B) is reused to a limit, any site is allowed after abandonment of the box (B) to set up a new key box (B−1). As i=i−1 (=B−1), the flow goes to the step S5, where it has the new key box (B−1) and an updated unbar data {B−1, j [=K]} of own site. This unbar data will be shared in a described manner between communication peers, who will thus share the new key box (B−1). The backward indexing provides a key box of future, unused session keys free from known-key attacks.

The Loop-j has been observed to be competent with an IP security to DES-CBC.

In the current proposal[*6], an out-of-band mechanism 100 is responsible for session key establishment, i.e. key generation and transport. In the embodiment, an in-band mechanism 10 makes it. The current proposal supports a perfect forward secrecy through the out-of-band mechanism. The embodiment supports the Perfect Secrecy at the in-band mechanism. The current proposal controls a short-term key needing a frequent ISAKMP SA update with a fairly high overhead. The embodiment employs an IP key 11 to be set up simply once before subsequent IP-inline actions free of overhead. Ping speed is competent.

The IP-inline key management system 10 has broken through difficulties of the Internet Draft[*6] in which, before a security association can be established, at least one pair of messages need to be exchanged between communication peers. For efficiency, this suggests that ISAKMP setup should be infrequent However, general principles of key management suggest that individual keys should be used as smaller times as practical and changed as frequently as possible.

According to the embodiment, indexed session keys are information-theoretically isolated from each other by entropy barriers incorporated therein, and prevents a compromise of secrecy on any past, used session key nor future, yet unused session key. The session key is large enough in size to diverge the candidate-key tree beyond a computationally secure number of candidate keys. Therefore, the IP-inline key management mechanism ensures that an original keying material is unconditionally secure, in spite of an automatic key generation.

The session key generator SKGn drops crypt-information to make entropy barriers in a set of session keys it is generating, and provides an unbar data for use to unbar corresponding entropy barriers in a separately prepared set of like session keys. The dropped information is inaccessible. However, the unbar data is accessible at communication peers, as it simply represents a combination of indices, which can be effective unbar data merely when used for pointing a session key in an identical session key set.

Industrial Applicability

The invention provides VPN's (virtual private networks), whose security services support Perfect Secrecy for session keys in a cost effective manner, and unconditional security for an original keying material, even to a manual keying.

The invention allows a long-term service of the keying material for IP-layer, permitting a manually configured keying to realize a selectively encrypting firewall.

The invention can contribute to a business-to-business tunneling protocol without needing CA's (certificate authorities).

References

*1: C. E. Shannon, "Communication Theory of Secrecy Systems", Bell Systems Technical Journal, 28 (1949), 665–715.

*2: Handbook of Applied Cryptography, CRC Press, U.S.A., 1997, by Alfred J. Menezes, Paul C. van Oorschot, and Scott A. Vanstone, pp. 49–496.

*3: RFC (Recommend for Comment) 1825; RFC 1826; and RFC 1827.

*4: Draft-ietf-ipsec-isakmp-10.txt,.ps/Jul. 3, 1998.

*5: Draft-ietf-ipsec-oakley-02.txt, "OAKLEY Key Determination Protocol"; and

Draft-ietf-ipsec-isakmp-oakley-08.txt/June 1998, "Internet Key Exchange".

*6: Draft-ietf-ipsec-inline-isakmp-01.txt (March 1997)

*7: Japanese Patent Application Laid-open Publication No. 9-292978, published Nov. 11, 1997.

What is claimed is:

1. A key management mechanism comprising:
   an IP-key for entering a closed IP network;
   a key generator for generating from the IP-key a set of session keys indexed for identification, the set of session keys having a divergence barrier incorporated therein for barring a computational approach to an arbitrary session key;
   an index pointer for pointing an index to identify a session key; and
   an unbar data set for unbarring the divergence barrier,
   wherein an arbitrary pair of session keys are information-theoretically isolated from each other by a drop of information therebetween having an etropy difference corresponding thereto; and
   the divergence barrier develops as an integrated entropy difference along a way of the computational approach,
   wherein the drop of information comprises lost data on a sign data and a numeral data of a respective session key.

2. The key management mechanism of claim 1, wherein the unbar date set defines the drop of information between the arbitrary pair of session keys.

3. The key management mechanism of claim 1, wherein: the divergence barrier comprises a tree of candidate keys for the arbitrary session key; and the tree of candidate keys diverge with an increasing number of candidate keys beyond a computationally secure number, as the computational approach makes a way.

4. The key management mechanism of claim 3, wherein the unbar data set defines a unique candidate key to be the arbitrary session key.

5. The key management mechanism of claim 1, wherein the unbar data set comprises a regenerated set of session keys, and a sequence of index combinations for identifying a unique session key in the regenerated set of session keys.

6. The key management mechanism of claim 5, wherein:
   the regenerated set of session keys comprises a sequence of boxes of session keys; and
   a respective index combination comprises a combination of a first index for identifying a unique box of session keys, and a second index for identifying the unique session key in the unique box of session keys.

7. The key management mechanism of claim 1, wherein the index pointer does not point the index of any session key more than one time.

8. The key management mechanism of claim 1, wherein part of the unbar data set is built in an outer IP header and transmitted as a cleartext on the closed IP-network to a communication peer for a connection-less mission of a key agreement in an IP layer of the closed IP network.

* * * * *